Patented May 16, 1950

2,507,699

UNITED STATES PATENT OFFICE 2,507,699

COATING COMPOSITIONS, FILMS, AND PROCESS OF MAKING SAME

Donald E. Edgar, Westport, Conn., and Hilmer E. Winberg, Wilmington, Del., assignors to E. I. du Pont de Nemours & Company, Wilmington, Del., a corporation of Delaware No Drawing. Application September 17, 1947, Serial No. 774,668

7 Claims. (Cl. 154—97.5)

This invention relates to plastic compositions in the form of sheets and more particularly to calendering resinous plastic compositions which do not stick to the calender rolls during the sheeting operation.

Heretofore, calendering was a common means of preparing unsupported rubber sheets as well as rubber coated fabrics. Recently many substitutes have been suggested to replace rubber including various cellulose derivatives and resins of all types. These compositions are ordinarily not adapted to calendering since most of them become very sticky at elevated temperatures and, unless mixed with a large amount of filler, adhere to the calender rolls, and it is not possible to form a sheet or film of the composition of uniform thickness, either unsupported or on a fabric backing.

Various lubricants, such as waxes, soaps and salts of stearic and oleic acids and the like have been suggested as lubricants to prevent adhesion of the mass to the calender rolls, but while many of these materials are satisfactory for use with rubber, they affect resinous composition adversely. For example, stearic and oleic acids render many compositions unstable notwithstanding the fact that they are very weak acids. The other materials mentioned have a tendency to weaken the resinous film and limit the amount of composition which can be calendered onto the fabric and impair the wearing properties of the finished sheet or film.

Chlorosulfonated polymers of ethylene are new plastic materials having unusual wearing qualities which have just recently become available. It, however, is difficult to prepare films from compositions containing the chlorosulfonated polymers of ethylene by the calendering process since the compositions do not readily release from the milling or mixing rolls employed for masticating the pigments, fillers, accelerators, curing agents, etc. with the chlorosulfonated polymers of ethylene. Also, the chlorosulfonated polymers of ethylene containing compositions do not release from the calender rolls to form uniform films without considerable processing difficulty.

The known release agents normally employed for rubber (natural and synthetic) and certain plastics to overcome the problem of adhering to the milling rolls and calendering rolls are not satisfactory for use with chlorosulfonated polymers of ethylene since they are either basic, such as alkaline soaps; or acid, such as the higher fatty acids (oleic and stearic). Either acid or alkaline compounds result in scorching or premature curing of the chlorosulfonated polymers of ethylene composition during the milling and calendering operations.

It is therefore an object of this invention to provide unsupported calendered films and fabrics having a calendered film of a resinous material adhered thereto which present a surface which is highly resistant to wear. Another object is the provision of a lubricant or calender release agent which does not adversely affect the resinous composition. A still further object is the provision of a material which when incorporated in such compositions acts as a lubricant at calendering temperatures due to its incompatability with the resinous composition and which is reincorporated and compatible with the said composition at ordinary temperatures. A still further object is the provision of a calender release agent which does not result in premature curing or scorching when added to chlorosulfonated polymer of ethylene containing compositions. Other objects will appear as the description of the invention proceeds.

These and similar objects are accomplished by incorporating a small amount of a polyoxyethylene glycol in a chlorosulfonated polymer of ethylene containing composition which is capable of being calendered out in the form of an unsupported film or onto a fabric support at elevated temperatures.

The following detailed examples are given by the way of illustration and not limitation. Throughout the specification and claims, the parts are on a weight basis.

EXAMPLE I

An upholstery material was produced in accordance with the following:

A sateen cotton fabric running 1.12 yards per pound per 53 inch width was basecoated with 1½ ounces per square yard of non-volatile components of the following composition by means of a doctor knife:

*Base coating composition*

|  | Pounds | Ounces |
|---|---|---|
| Chlorosulfonated Polymer of Ethylene | 34 |  |
| Polymeric Methyl Methacrylate | 8 | 8 |
| Hydroquinone Mono Benzyl Ether |  | 5 |
| Wood Rosin | 1 | 5 |
| Magnesium Oxide | 4 |  |
| Litharge | 1 | 5 |
| Mercaptobenzothiazole |  | 5 |
| Retarder W (Salicylic Acid and a Dispersing Agent) |  | 5 |

The above ingredients were thoroughly mixed by masticating on a two roll rubber mill until homogenous. Due to internal friction, the mass heated up to approximately 200° F. during the mastication. Upon removal from the mill the mass was dissolved in sufficient toluol to produce a viscosity suitable for doctor knife application. The above composition dispersed in toluol was applied to the fabric in such a manner as to cause the composition to strike into the fabric and form a suitable base for subsequent calender coat. The volatile solvent was evaporated by passing the coated fabric through a heated tunnel.

The basecoated fabric was processed further by applying a calender coat of the following composition:

*Calender coating composition*

|  | Pounds | Ounces |
|---|---|---|
| Chlorosulfonated Polymer of Ethylene | 40 |  |
| Hydroquinone Mono Benzyl Ether |  | 7 |
| Wood Rosin | 4 |  |
| Sulfurized Oil (Neophax A) | 10 |  |
| Polyoxyethylene Glycol ("Carbowax 1500") (Molecular Weight Approximately 1500) | 1 | 4 |
| Finely Divided Calcium Carbonate (ppt.) | 32 |  |
| Colored Pigments | 5 | 14 |

The above ingredients were thoroughly mixed by masticating on a two roll rubber mill after which the material was taken from the rolls in the form of slabs and stored for further processing. During the milling operation, the composition heated to approximately 200° F. due to internal friction of the chlorosulfonated polymer of ethylene. The composition released from the two roll mill without any difficulty. After storing the following materials were added to the slabs on a two roll rubber mill:

|  | Pounds | Ounces |
|---|---|---|
| Magnesium Oxide | 4 | 13 |
| Litharge | 1 | 10 |
| Benzothiazyl Disulfide |  | 7 |

After the above ingredients were milled in the slabs, the mass was heated up to approximately 200° F. to form a plastic mass which is transferred to heated calender rolls where it is calendered onto the above-described base coated fabric. Approximately 10 ounces per square yard of the above calender composition were applied in one application to the basecoated fabric.

The calender coating composition released from the rolls of the two roll mixing mill and the calender rolls without any tendency to adhere to the heated rolls. There was no indication of scorching or premature curing of the calender composition during the mixing or calendering operation.

The above-described coated fabric was processed further by graining or embossing which is accomplished by passing between heated pressure rolls one of which is steel and has a design engraved on the surface. Heated pressure plates may also be employed for the embossing operation. The coated fabric may be further decorated by applying a dilute toluol dispersion of a composition similar to the calender coating composition containing pigments of contrasting color and lustre. The finishing composition is deposited in the valleys of depressed areas of the embossed design and wiped off the raised portion of the design. As a final manufacturing operation, the coated fabric was subjected to a temperature of 260° F. for two hours to cure or vulcanize the composition.

The coated fabric had all the desirable properties of a satisfactory upholstery. The processing was carried out without any difficulties of the chlorosulfonated polymer of ethylene composition adhering to the mixing rolls or calender rolls during any of the processing operations.

EXAMPLE II

The following ingredients were mixed on a water cooled two roll rubber mill:

| Chlorosulfonated polymer of ethylene | 400.0 |
|---|---|
| Hydroquinone mono benzyl ether | 4.0 |
| Sulfurized oil (Neophax A) | 100.0 |
| Wood rosin | 40.0 |
| Di-lorol phosphate (U. S. Pat. 2,005,619) | 8.0 |
| Finely divided calcium carbonate (ppt.) | 320.0 |
| Colored pigments | 26.2 |
| Magnesium oxide | 48.0 |
| Litharge | 16.0 |
| Benzothiazyl disulfide | 4.0 |
| Polyoxyethylene glycol ("Carbowax 4000") (molecular weight approximately 4000) | 12.0 |

The above ingredients were milled together on a two roll water cooled rubber mill. The internal friction caused the mass to heat up to about 200° F. After the composition was thoroughly mixed to form a homogenous mass, it was taken from the rolls in the form of sheets without any tendency for the material to stick to the rolls. Also there was no tendency for the material to scorch or cure prematurely on the mixing rolls. Polyoxyethylene glycol having a molecular weight of approximately 1500 was substituted for the 4000 molecular weight material in the above formula and equally good results were obtained.

When conventional release agents were substituted in the above formula for the polyoxyethylene glycol, the composition stuck to the mixing rolls, and it was not possible to remove the material from the rolls in the form of sheets without considerable difficulty.

EXAMPLE III

The following ingredients were thoroughly masticated on a water cooled two roll rubber mill. This composition represents the highest ratio of polyoxyethylene glycol to chlorosulfonated polymer of ethylene which can be processed satisfactorily.

| Chlorosulfonated polymer of ethylene | 200.0 |
|---|---|
| Hydroquinone mono benzyl ether | 2.0 |
| Wood rosin | 20.0 |
| Polyoxyethylene glycol ("Carbowax 1500"— molecular weight approximately 1500) | 10.0 |
| Finely divided calcium carbonate (ppt.) | 200.0 |
| Colored pigments | 28.4 |
| Benzothiazyl disulfide | 2.0 |

After the above ingredients were thoroughly milled to a homogenous mass and heated to approximately 200° F., the composition was taken from the rolls in the form of sheets without any tendency for the composition to adhere to the rolls. There was no indication of scorching or premature curing of the composition.

The composition was stored and processed later in a manner similar to the procedure outlined in Example I. The above composition released from the calender rolls without difficulty when calendered onto a basecoated fabric as described in Example I.

EXAMPLE IV

The following ingredients were mixed on a water cooled two roll rubber mill.

|  | Pounds | Ounces |
|---|---|---|
| Chlorosulfonated Polymer of Ethylene | 40 |  |
| Hydroquinone Mono Benzyl Ether |  | 7 |
| Wood Rosin | 4 |  |
| Sulfurized Oil (Neophax A) | 10 |  |
| Polyoxyethylene Glycol ("Carbowax 300"— Molecular Weight Approximately 300) | 1 | 4 |
| Finely Divided Calcium Carbonate (ppt.) | 32 |  |
| Colored Pigments | 5 | 4 |
| Magnesium Oxide | 4 | 13 |
| Litharge | 1 | 10 |
| Benzothiazyl Disulfide |  | 7 |

The above composition was processed in the same manner as outlined in Example I. The composition released from the two roll mill as well as the calender rolls without any difficulty. There was no indication of premature scorching or curing during the milling or calendering operations.

EXAMPLE V

The following ingredients were milled together in the same manner as the previous examples:

| | |
|---|---|
| Chlorosulfonated polymer of ethylene | 200.0 |
| Zinc salt of xylyl mercaptide | 2.0 |
| Hydroquinone mono benzyl ether | 2.0 |
| Wood rosin | 20.0 |
| Polyoxyethylene glycol ("Carbowax 1500"— molecular weight approximately 1500) | 8.0 |
| Finely divided calcium carbonate (ppt.) | 160.0 |
| Colored pigments | 28.4 |

The above ingredients were thoroughly milled until the mass was homogenous. The temperature of the composition increased to about 200° F. during the milling. The material was taken from the rolls in the form of sheets and stored before processing further as outlined in Example I. The following ingredients were milled in the composition on a two roll mill just before calendering on base coated fabric:

| | |
|---|---|
| Magnesium oxide | 24 |
| Litharge | 8 |
| Mercaptobenzothiazole | 2 |

The above composition released from the two roll mill as well as the calender rolls without difficulty. There was no indication of premature curing or scorching of the above composition during the milling and calendering operations.

EXAMPLE VI

The following example represents the lowest ratio of polyoxyethylene glycol to the chlorosulfonated polymer of ethylene which gives satisfactory results with respect to release of the composition from the milling and calender rolls:

| | |
|---|---|
| Chlorosulfonated polymer of ethylene | 200.0 |
| Hydroquinone mono benzyl ether | 2.0 |
| Wood rosin | 20.0 |
| Sulfurized oil (Neophax A) | 50.0 |
| Polyoxyethylene glycol ("Carbowax 1500"— molecular weight approximately 1500) | 4.0 |
| Finely divided calcium carbonate (ppt.) | 160.0 |
| Colored pigments | 18.4 |
| Magnesium oxide | 24.0 |
| Litharge | 8.0 |
| Benzothiazyl disulfide | 2.0 |

The above was milled as outlined in Example I and the last three ingredients were added just prior to calendering. The release from the milling rolls and calender rolls was not as good as the examples containing a higher ratio of polyoxyethylene glycol to chlorosulfonated polymer of ethylene although the material could be processed without too much difficulty.

The chlorosulfonated polymer of ethylene in the foregoing examples may be prepared in accordance with the teaching of U. S. Patent 2,212,786, issued August 27, 1940 to McQueen.

The polyoxyethylene glycols are obtainable from Carbide and Carbon Chemicals Corporation under their trade designation "Carbowax." The polyoxyethylene glycols having a molecular weight range of 200 to 1000 are liquids and those having a molecular weight in excess of 1000 are solids at room temperature. The polyoxyethylene glycols are described more fully by C. R. McClelland and R. L. Bateman in Chemical and Engineering News—issue of February 10, 1945.

The following table shows the ratio of polyoxyethylene glycol to chlorosulfonated polymer of ethylene in the foregoing examples:

|  | Ex. I | Ex. II | Ex. III | Ex. IV | Ex. V | Ex. VI |
|---|---|---|---|---|---|---|
| Chlorosulfonated Polymer of Ethylene | 100 | 100 | 100 | 100 | 100 | 100 |
| Polyoxyethylene Glycol | 3.125 | 3 | 5 | 3.125 | 4 | 2 |

In the above examples the ratio of polyoxyethylene glycol to chlorosulfonated polymer of ethylene varies between 2 parts of polyoxyethylene glycol to 100 parts of chlorosulfonated polymer of ethylene and 5 parts of polyoxyethylene glycol to 100 parts of chlorosulfonated polymer of ethylene.

If the ratio of polyoxyethylene glycol to chlorosulfonated polymer of ethylene is increased beyond 5 parts of the former to 100 parts of the latter, the composition will develop a cellular structure during the curing operation. In fact, suitable sponges can be made with the chlorosulfonated polymers of ethylene using polyoxyethylene glycols as blowing agents as disclosed in copending application S. N. 744,018, filed April 25, 1947, by Edgar et al.

In cases where a strong bond of the film to the base fabric is not required, the base coating composition can be omitted entirely in which case the calender composition is applied directly to the fabric.

The calender coating composition of Example I was calendered out in the form of unsupported sheets having a thickness of .020 inch and .030 inch. The sheets released from the calender rolls without any difficulty and were then cured for 2 hours at 260° F. The unsupported sheets were useful for upholstery material where high tearing strength is not required. Films as thin as .002 inch can be prepared with the compositions of this invention.

The neutral unctuous character of the polyoxyethylene glycol makes this material particularly useful with chlorosulfonated polyethylene since acid or alkaline materials will result in premature curing or scorching of the composition during the milling and calendering operation.

The invention is also useful in preventing sticking to metal surfaces while the composition is undergoing mastication or while it is being molded, extruded, or subject to similar forming treatments.

The advantages of the present invention are primarily the prevention of sticking to metal surfaces during the preparation of compositions capable of use in coating fabrics by calendering and the production of smooth, uniform unsupported films. Another advantage is the preparation of very thin films by the calender method in the absence of volatile solvents.

It is apparent that many widely different embodiments of this invention may be made without departing from the spirit and scope thereof, and therefore, it is not intended to be limited except as indicated in the appended claims.

We claim:

1. A calenderable composition comprising a chlorosulfonated polymer of ethylene, curing agents therefor and polyoxyethylene glycol, said glycol being present in amount between 2 and 5 parts for every 100 parts of the chlorosulfonated polymer of ethylene.

2. A fabric having a film superimposed thereon of the composition of claim 1.

3. An unsupported film of the composition of claim 1.

4. The composition of claim 1 in which the polyoxyethylene glycol has a molecular weight of from 300 to 4000.

5. Process of preparing a film comprising a chlorosulfonated polymer of ethylene which includes the steps of milling a composition containing a chlorosulfonated polymer of ethylene, curing agents therefor and from 2 to 5 parts of a polyoxyethylene glycol having a molecular weight of from 300 to 4000 for each 100 parts of chlorosulfonated polymer of ethylene and calendering the chlorosulfonated polymer of ethylene and polyoxyethylene glycol containing composition in the form of a film by passing between heated metal rolls.

6. The process of claim 5 in which the composition is calendered on the fabric base.

7. A fabric base having a plurality of coatings, an anchor coat next to the fabric and superimposed thereon a heavy film having the following composition:

| | Pounds | Ounces |
|---|---|---|
| Chlorosulfonated Polymer of Ethylene | 40 | |
| Hydroquinone Mono Benzyl Ether | | 7 |
| Wood Rosin | 4 | |
| Sulfurized Oil | 10 | |
| Polyoxyethylene Glycol (Molecular Weight Approximately 1500) | 1 | 4 |
| Finely Divided Calcium Carbonate | 32 | |
| Colored Pigments | 5 | 14 |
| Magnesium Oxide | 4 | 13 |
| Litharge | 1 | 10 |
| Benzothiazyl Disulfide | | 7 |

DONALD E. EDGAR.
HILMER E. WINBERG.

REFERENCES CITED

The following references are of record in the file of this patent:

UNITED STATES PATENTS

| Number | Name | Date |
|---|---|---|
| 2,353,228 | Ducca | July 11, 1944 |
| 2,369,471 | Latham | Feb. 13, 1945 |
| 2,416,061 | McAlevy et al. | Feb. 18, 1947 |